Nov. 18, 1958 H. C. SCHINK 2,860,650
FLUID PRESSURE DEVICES
Filed Nov. 1, 1952 3 Sheets-Sheet 1

INVENTOR.
HOWARD C. SCHINK
BY
Raymond W. Jenkins
ATTORNEY

Nov. 18, 1958   H. C. SCHINK   2,860,650
FLUID PRESSURE DEVICES
Filed Nov. 1, 1952   3 Sheets-Sheet 2

INVENTOR.
HOWARD C. SCHINK
BY
Raymond W. Jenkins
ATTORNEY

Nov. 18, 1958  H. C. SCHINK  2,860,650
FLUID PRESSURE DEVICES
Filed Nov. 1, 1952  3 Sheets-Sheet 3

INVENTOR.
HOWARD C. SCHINK
BY
Raymond W. Jenkins
ATTORNEY

United States Patent Office 2,860,650
Patented Nov. 18, 1958

2,860,650

FLUID PRESSURE DEVICES

Howard C. Schink, Cleveland Heights, Ohio, assignor to Bailey Meter Company, a corporation of Delaware Application November 1, 1952, Serial No. 318,308

5 Claims. (Cl. 137—85)

My invention relates to systems and apparatus for indicating, recording, or otherwise exhibiting and/or controlling the value of a position, measurement or variable. More particularly, the invention relates to such systems wherein a fluid pressure is established representative of that which is to be measured or controlled, and then the fluid pressure is used to actuate an exhibiting or controlling device. My invention is particularly adapted to the telemetering of a value to an adjacent or remote point; or for amplifying the power of a responsive device, such as a Bourdon tube, flow meter, or the like, so that an exhibiting or controlling device may be accurately positioned. While not necessarily so limited, the invention is particularly adapted and useful in fluid pressure telemetering systems employing air under pressure as the active motive fluid and is so disclosed herein, by way of example only.

It is frequently necessary, in connection with such systems, to furnish one or more fluid pressure relays, receiving the fluid loading pressure which is representative of the variable, and establishing an output control pressure which may be of the same or of a different magnitude for actuation of the receiver mechanism. Frequently such fluid pressure relays are employed to give the algebraic summation of two or more individual loading pressures, to double or halve the loading pressure value, to ratio it, or to otherwise modify the loading pressure representative of one or more variables into a resultant outgoing control pressure bearing the determined value relationship to the measurement variable or variables. Such relay, or relays, are usually physically located intermediate the point of measurement and the point of exhibiting or controlling.

Usually these relays are of the force-balance, position-balance, or force-position-balance type and employ expansible-contractible pressure receiving chambers having a movable wall for varying a force or position system. Common types include bellows and diaphragms of various materials.

In fluid pressure measuring and/or control systems, and especially in pneumatic telemetering systems, upon rapid and material changes in ambient pressure there may be introduced an error due to such variations and it is to the correction or compensation for such variations and the effect thereof upon said relays that I am particularly concerned in the present invention.

In such a system, for proper control a standard base or datum value must be chosen, i. e. one that is valid not only at the location where the system is designed and adjusted but unvarying with change in location and any corresponding change in barometric pressure or in the ambient pressure adjacent the different instruments and particularly the relay. Inasmuch as absolute pressure varies with barometric or ambient pressure changes, it is not a valid reference or base. On the other hand, gage pressure is an invariable standard, regardless of variation in ambient value. The gage value is usually written as "p. s. i. g.", specifically denoting pounds-per-square-inch gage.

Absolute pressure, that is, the pressure above absolute zero, is the algebraic summation of the atmospheric pressure and the indicated or gage pressure p. s. i. g., considering gage pressures as positive and vacuum readings as negative. Absolute pressure is actual total pressure, acting on a surface. Whatever unit of measurement is used, the zero point is perfect vacuum. This term is used of necessity in engineering work to denote that the atmospheric pressure need not be added, or has been added. The usual engineering unit is "p. s. i. a." denoting pounds - per - square - inch absolute. Absolute pressure gages are those which are not affected by barometric pressure in their indications of pressures to which they are applied. The simplest example is the closed-end U-tube. A barometer is an absolute pressure gage applied to the atmosphere and therefore measuring only the atmospheric pressure. Readings usually are in inches of mercury.

Certain of the components of a pneumatic measuring and controlling system produce and operate on a gage pressure basis uninfluenced by variations in ambient pressure values. It is to the automatic correction of those components which are affected by variations in ambient pressure values, over to a gage pressure standard, that my present invention is directed.

Most of the loading pressure establishing devices, such as fluid pressure pilot valves, produce loading pressures in terms of gage pressure unaffected by variations in ambient pressure. Such is true of the pilot valve disclosed and claimed in the Johnson Patent 2,054,464, the pilot valve arrangement of Gorrie Patent 2,141,464 as well as the loading pressure developer disclosed and claimed in the copending application of Gorrie et al. S. N. 289,402, or the one of Gorrie application S. N. 169,751, now Patent 2,675,015; all of which types are illustratively used herein to produce a gage pressure loading irrespective of barometric or ambient pressure changes surrounding the loading pressure developer.

In the pilot valve type of loading pressure developer a supply of pressure air at about 28 p. s. i. g. is made available by a pressure reducing valve from a source at considerably higher pressure. Variations in ambient pressure are felt at the reducing valve as well as at the loading pressure developer and the loading pressure so developed continues to be on a gage pressure basis representative of the variable being measured. Similarly the devices receiving the established control pressures are responsive to gage pressure values and usually are not affected by variations in ambient pressure.

Relays employing an expansible-contractible chamber having a movable wall determining a force or position in accordance with the differential between a loading gage pressure applied to one side of the wall and the ambient pressure applied to the other side of the wall, are unaffected by variations in barometric or ambient pressure, as the change is equally effective upon both sides of the wall. If the relay has a chamber wall subjected on one side to a pressure through a restricted bleed valve governing the passage of air therethrough, any change in ambient pressure will cause a temporary change in the wall's effective force in proportion to the ambient pressure change, while the change in ambient pressure is occurring, until the bleed has ceased. This results in a proportional and unwanted change in the output control pressure of the relay.

By providing a compensating chamber, duplicating the bleed receiving chamber, and opposing it mechanically, with a similar bleed valve communicating with the ambient pressure, then the effect of ambient pressure changes are equal and opposite, and the output pressure is not disturbed.

Relays of the type requiring such compensation are illustrated in several forms in the present disclosure and are usually of a type having what is termed a bleed chamber receptive only of pressures bleeding thereto through an adjustable restriction, usually from another chamber which is in itself receptive of an incoming loading pressure.

One such relay is the standardizing relay illustrated Fig. 4 of the Gorrie Re. Patent 21,804 having a chamber 26 receptive of the pressure in chamber 27 through the adjustable restricting valve 37. The patent to Dickey 2,098,913 discloses a similar type of relay.

In the Gorrie Re. Patent 21,804 there is shown in Fig. 1 a control system operating in response to the changes in a condition for regulating the flow of fluid so as to maintain the condition at some predetermined value. Included in the system is a standardizing relay of the type shown to larger scale in Fig. 4 which is balanced when the condition is at the desired value, and which operates when balanced to supply a constant pressure to a valve means regulating the flow of fluid affecting the condition. If the condition varies from the desired value in one direction, the relay is unbalanced to supply a continuously increasing pressure to the valve means for positioning the latter in a direction to effect a return of the condition to the desired value. A variation of the condition in the opposite direction from the desired value causes the relay to become unbalanced and decrease the pressure continuously for positioning the valve means to return the condition to the desired value. The function of such a relay is to immediately reproduce the incoming loading pressure changes in the outgoing control pressure, and by means of regenerative action, to amplify the change in outgoing air loading pressure until the incoming air loading pressure is returned to a predetermined standard value. Upon a deviation of the control condition from the desired magnitude the system first operates to vary the rate of application of the agent, or agents, producing the condition a proportional amount, and thereafter to slowly vary the rate of application of the agent, or agents, until the condition is restored to the desired magnitude. The relay provides a control of relatively high sensitivity but low speed superimposed upon a control of low sensitivity but high speed.

Fitch Patents 2,441,405 and 2,586,637 disclose force-balance relays which, while not of standardizing type, have trapped chambers receptive of fluid pressure bleed from an active chamber. Another form of force-balance ratio relay illustratively used in the present disclosure is disclosed in the copending application of Paul S. Dickey Serial No. 287,074, now Patent 2,747,595. An example of a force-position-force-balance relay to which the present invention may be applied is disclosed and claimed in the copending application of Harvard H. Gorrie, S. N. 311,098, now Patent 2,776,669.

The invention finds its application and usefulness wherever there is to be expected any material variation in ambient pressure values, from the ambient conditions under which the relay was designed and calibrated. This might, for example be if the receiving customer's plant is at a decidedly different elevation than where the relay was manufactured. It might be for use in processes, test chambers, and the like where material variations in ambient pressures are expected. In aircraft, decided barometric pressure changes are experienced due to different elevations above sea level. For submarine use an entirely different condition is encountered.

The ambient pressure conditions existing within the hull of a submarine are not representative of depth of submergence in feet of water weight upon the exterior skin of the submarine. At surface operation the barometric pressure gage within the hull (sensitive to ambient pressure) would show 14.7 p. s. i. a. (sea level) plus the weight of the air in the few feet difference between the location of the gage in the hull and the surface of the sea level. Under submerged operation a barometric pressure gage would indicate sea level pressure with a slight deviation due to the use of air from the interior or the excess supply of air thereto, resulting from consumption and oxygen generator supply. When completely submerged, the air within the hull for human use and for combustion purposes, is usually supplied by vaporizing liquid oxygen and the pressure within the hull is not allowed to vary to any great extent as for example between 12.5 p. s. i. a. and 15.5 p. s. i. a. under submerged operation.

Under snorkel operation the submarine is submerged except for the snorkel and the barometric gage would be a few feet below sea level. Thus its reading would be 14.7 plus the pressure equivalent to the number of feet that the gage is actually below sea level. Additionally, the gage is subjected to hull interior ambient pressure variation caused by snorkel operation. In other words, whenever the snorkel head is submerged by a wave it closes and some of the air in the hull interior is used for combustion purposes while the snorkel is not admitting air. As soon as the snorkel again opens there is a rush of air to the interior of the hull and thus on snorkel operation there may be an intermittent swing of hull ambient pressure. Such pressure swings within the hull may be as much as 2 p. s. i. g. on an eight-second cycle but if the snorkel stayed closed for more than eight seconds the air within the hull would be so drastically used up for combustion that it would be dangerous to humans.

The principal object of the present invention is to provide a fluid pressure relay automatically self-compensated for variations in ambient pressure values.

Figure 5:
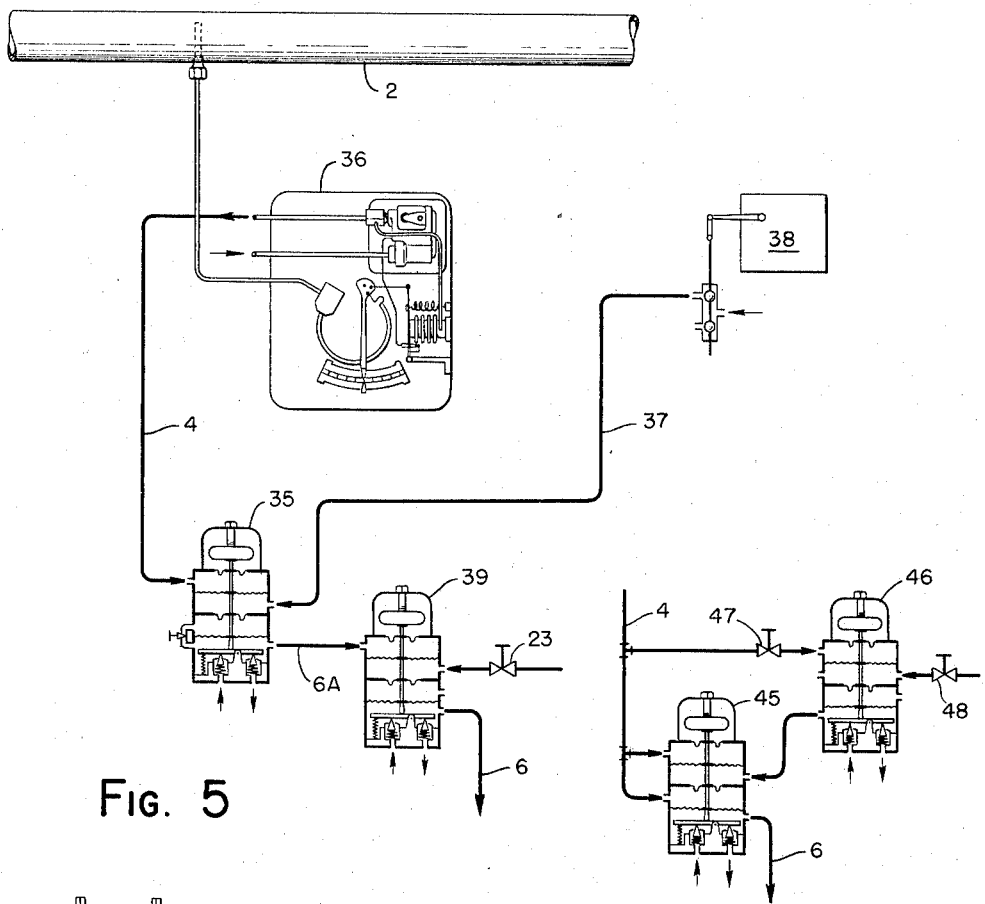

Fig. 5 diagrammatically illustrates how the invention is applied to a system responsive to a plurality of variables.

Figure 6:
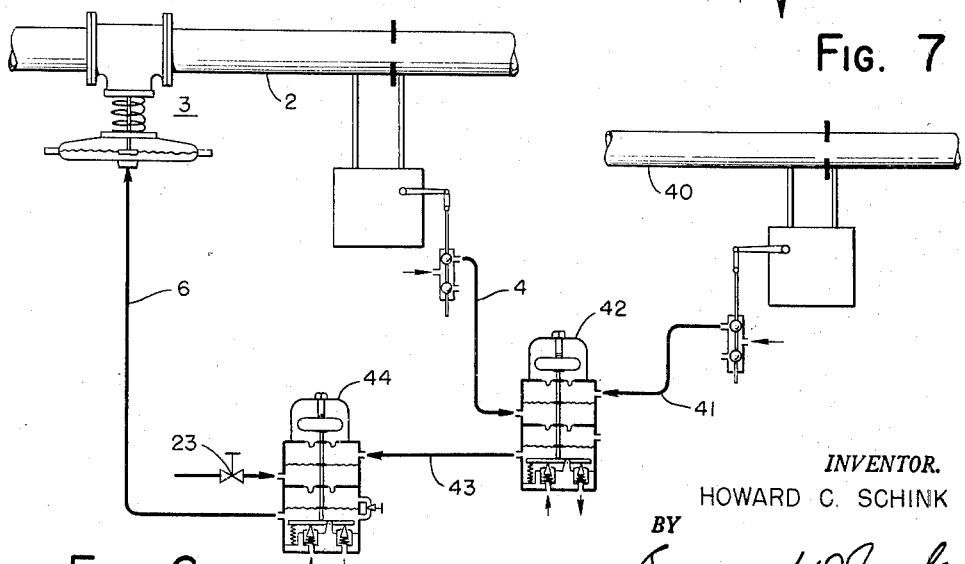

Fig. 6 is somewhat similar to Fig. 5 but applies the invention to a flow ratio control system.

Figure 7:
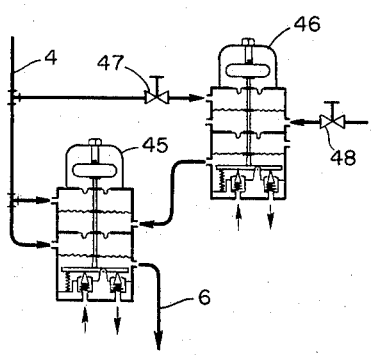

Fig. 7 illustrates my invention as applied to one form of accelerating relay.

Figure 1:
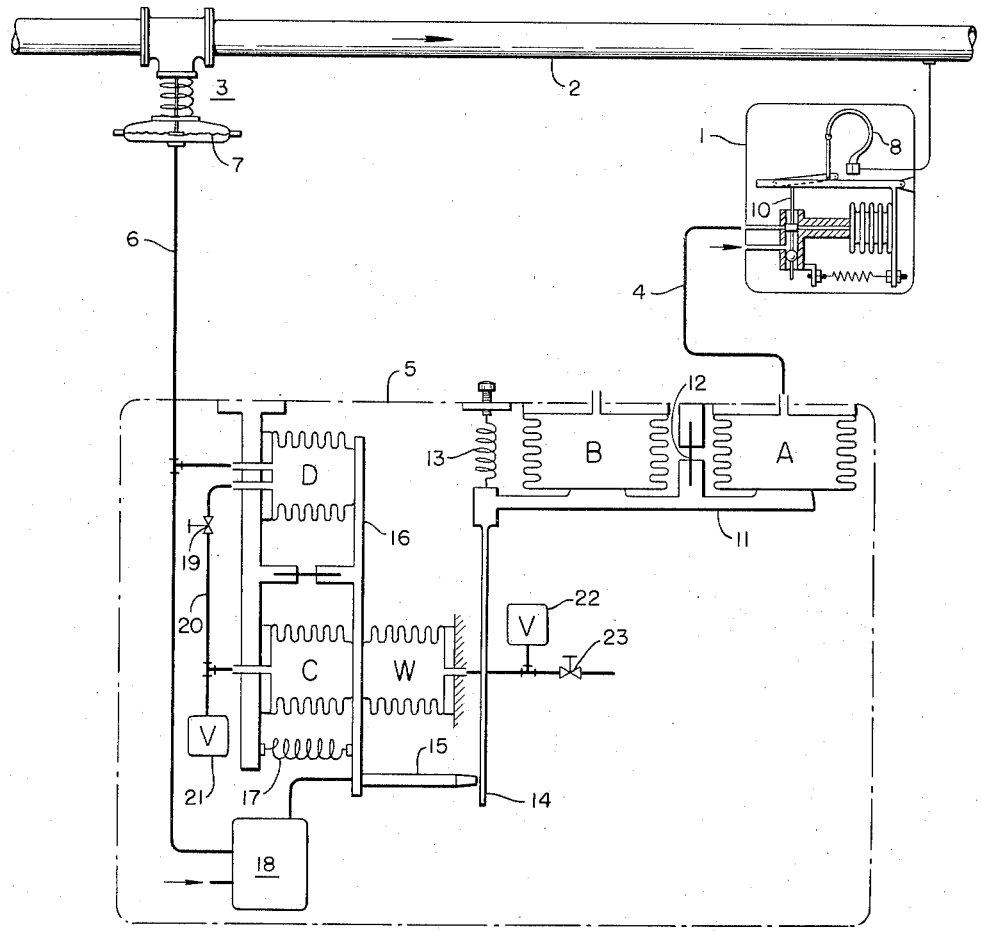
Fig. 1 illustrates, in quite diagrammatic fashion and not to scale, a simple pressure control system including a measuring transmitter, a ratio relay embodying the present invention, and a receiving control valve.

Referring in particular to Fig. 1 I show therein a simple control system wherein a measuring controller 1 is sensitive to the static pressure of a fluid flowing through a conduit 2, for controlling the same by means of a regulating valve 3. The transmitter 1 may be of the type disclosed and claimed in the co-pending Gorrie application S. N. 169,751, now Patent 2,675,015, having a Bourdon tube 8 continuously sensitive to the value of a variable such as fluid pressure within the conduit 2, and continuously establishing in a pipe 4, by means of a pilot 10, a pneumatic fluid loading pressure (within a preselected range for example 5–25 p. s. i. g.) proportionately representative of some range of values of the variable. Such a range may be a range from zero to maximum expected value or a suppressed range within the confines of such extremes.

The pipe 4 joins a pneumatic relay 5 which establishes in a pipe 6 a fluid control pressure bearing desired relation to the pressure within the pipe 4. The pipe 6 communicates with the diaphragm chamber of the valve 3 for positioning the diaphragm 7 and thereby the flow and/or pressure controlling internal portions of the valve 3.

Due to the limitation in space of the present drawing sheet and the desire to have the relay 5 shown to as large a scale as possible, it is not feasible to accentuate the possibility of distance between the elements 1, 5 and 3. It will, however, be appreciated that, in view of my present invention, the transmitter 1 is preferably located immediately adjacent the desired point of pressure measurement for the conduit 2 to minimize measuring piping, lag in measurement, etc. The location of the valve 3 is fixed by design of the plant and may be at a considerable distance from the measuring point 1. Preferably, the relay 5 is located at a central panel board under the observation of an operator.

The relay 5 (drawn to exaggerated scale) is preferably of the force-position-force-balance type disclosed and claimed in the co-pending application of Harvard H. Gorrie, S. N. 311,098, now Patent 2,776,669, having a force-balance beam 11, pivoted as at 12, and acted upon by the movable wall of an expansible-contractible chamber A which receives the pneumatic loading pressure from pipe 4. A similar chamber B opposingly acts upon the force-balance beam 11 and is shown as open to the atmosphere. In this embodiment the B chamber is an idle chamber. It might be the recipient of another loading pressure under certain conditions of operation. The force-balance beam 11 is loaded by an adjustable spring 13 and is arranged to position a baffle 14 relative to a nozzle 15; the elements 14, 15 comprising a nozzle-baffle couple of known type which can be referred to as one form of supply and waste valve or fluid pressure couple.

In similar manner a pair of substantially similar expansible-contractible chambers C, D act upon a force-balance beam 16 loaded by a spring 17 and arranged to position the nozzle 15 relative to the baffle 14.

Cooperating with the nozzle 15 and the baffle 14 is a booster relay 18 of the type disclosed and claimed in the co-pending application of Harvard H. Gorrie, S. N. 289,402, now Patent 2,737,963. The fluid control pressure established by the booster relay 18 in the output pipe 6, as a result of the position relation of force beams 11, 16, not only reaches the valve 3 controlling the fluid in conduit 2, but is effective within the chamber D to balance the system.

The relay 5 is of the standardizing type disclosed and claimed in the Gorrie Re. Patent 21,804 and Dickey 2,098,913, having an adjustable bleed between the D and C chambers. The adjustable restriction 19, in the tie-line 20, in conjunction with a volume chamber 21, provides (with the chamber C) a regenerative action. Upon change in pressure within the balancing chamber D a bleed occurs through the pipe 20 in one direction or the other between the D and C chambers.

The devices 1 and 18 are gage pressure producing devices so that pressure effective within the chambers A and D have gage pressure values irrespective of ambient pressure which is effective upon the exterior of the chambers. The same condition is not true of a chamber such as C which receives only a bleed pressure from an active chamber such as D. Ambient pressure variations affect the exterior of the chamber C and thus its effective force upon the force-balance beam 16. It is to the correction of such errors that the present invention is particularly directed.

Any trapped chamber receiving fluid pressure only through a restrictive bleed, as for example, from an active chamber, is adversely affected by variations in ambient pressure and the other figures of this drawing illustrate various types of relays having such trapped chambers, as well as the corrective measures applied thereto under the teaching of the present invention. The difficulty, and its corrective measure, are equally pertinent to relays utilizing diaphragm construction as well as those utilizing bellows or other types of expansible-contractible chambers. With one of the restrictively connected chambers momentarily "trapping" the fluid within itself upon ambient pressure variations a differential force is set up on their connecting beam which causes the attached pressure establishing mechanism to position and alter the output established by the unit.

Upon a reduction of ambient pressure, supply pressure to the D chamber, as well as the loading pressure to the A chamber, reduces correspondingly on an absolute basis. There is no reduction on a gage pressure basis. Although the D chamber pressure remains on a constant gage pressure basis its reduction is quite definite on an absolute basis and is not matched by a like reduction in the C chamber because the restricted connection between them prevents fluid from instantaneously flowing therefrom. Therefore an unwanted error force acts upon the beam 16.

The bleed valve 19 between the D and C chambers prevents the internal pressure of chamber C from changing at the same rate as that of chamber D, therefore, a force-differential is established on the C—D beam 16 which varies the output of the relay. To compensate for this distorting force I apply a counteracting expansible-contractible bellows chamber W opposing the C chamber on the force-balance beam 16 and having a volume chamber 22 as well as a bleed valve 23 opening to the atmosphere. The bleed setting of valve 23 is preferably the same as the setting of valve 19. Thus, upon change in ambient pressure, the pressure within the chamber W will vary at the same rate as pressure variations effective within the bellows C and counteract the adverse effect which ambient pressure variations would otherwise have upon the chamber C.

With bellows W open to atmosphere through bleed valve 23 and opposing C bellows a change in ambient pressure will cause both C and W bellows pressures to remain on an absolute basis with no resultant motion of the beam 16. The output of booster 18 will therefore remain on a constant gage pressure basis. A differential pressure, however, equivalent to the change in barometric pressure will exist across both valves 19 and 23. By timing 23 bleed proportional to 19 bleed this differential will be equalized at the same rate with no resultant effect upon force beam 16 and therefore the output in D bellows and pipe 6 remains on a constant gage pressure basis as desired.

Figure 2:
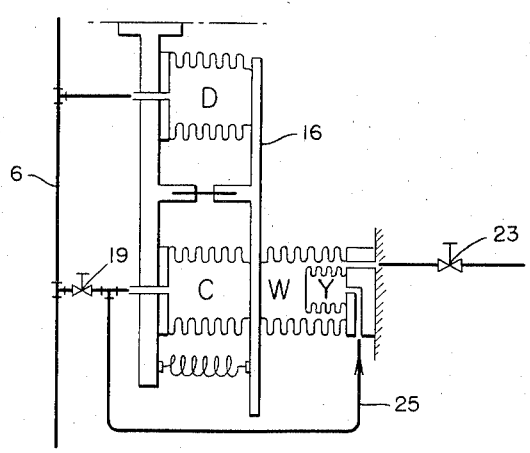
Fig. 2 illustrates another embodiment of the relay of Fig. 1.

Since, however, for a constant bleed valve setting, flow therethrough varies directly as the change in density, due to available pressures in the C bellows, variable valve 23 setting would be required for each D chamber output pressure for correct timing. It is possible to adjust the bleed valve 23 for an average bleed rate of valve 19 and an average operating value or range in values of D chamber pressure. However, Fig. 2 shows a further bellows Y installed within the W chamber and connected to the C bellows pressure by way of a pipe 25. The Y bellows is mounted in such a way that it does not influence the position of the beam 16 but does serve to vary the volume of the W bellows proportional to the value of C chamber pressure and therefore has the same effect as varying the adjustment of restrictive valve 23. Alternatively, the bellows Y might be arranged to position the valve 23.

In Fig. 3 I again show a simple fluid pressure control system in which the conduit 2A may be the same conduit as conduit 2 or may be a different one. The measuring controller 1A is shown as of the type disclosed in the Gorrie Patent 2,141,464 continuously establishing in the pipe 4 a fluid loading pressure proportional to, or representative of, pressure within the conduit 2.

The relay 5A is termed a "stacked" relay, utilizing diaphragms and of the general arrangement disclosed in the Gorrie Patent Re. 21,804 and the Dickey Patent 2,098,913. Here again the loading pressure of pipe 4 is subjected upon the A chamber while the B chamber would normally be an idle chamber open to the atmosphere. This is a force-balance relay wherein all four of the chambers act upon a single force member 26 so that the B chamber may be used as the compensating chamber without the necessity of having to add an additional chamber to the system, as was the case in connection with the force-position-force balance relay 5 of Figs. 1 and 2.

Figures 3, 4:
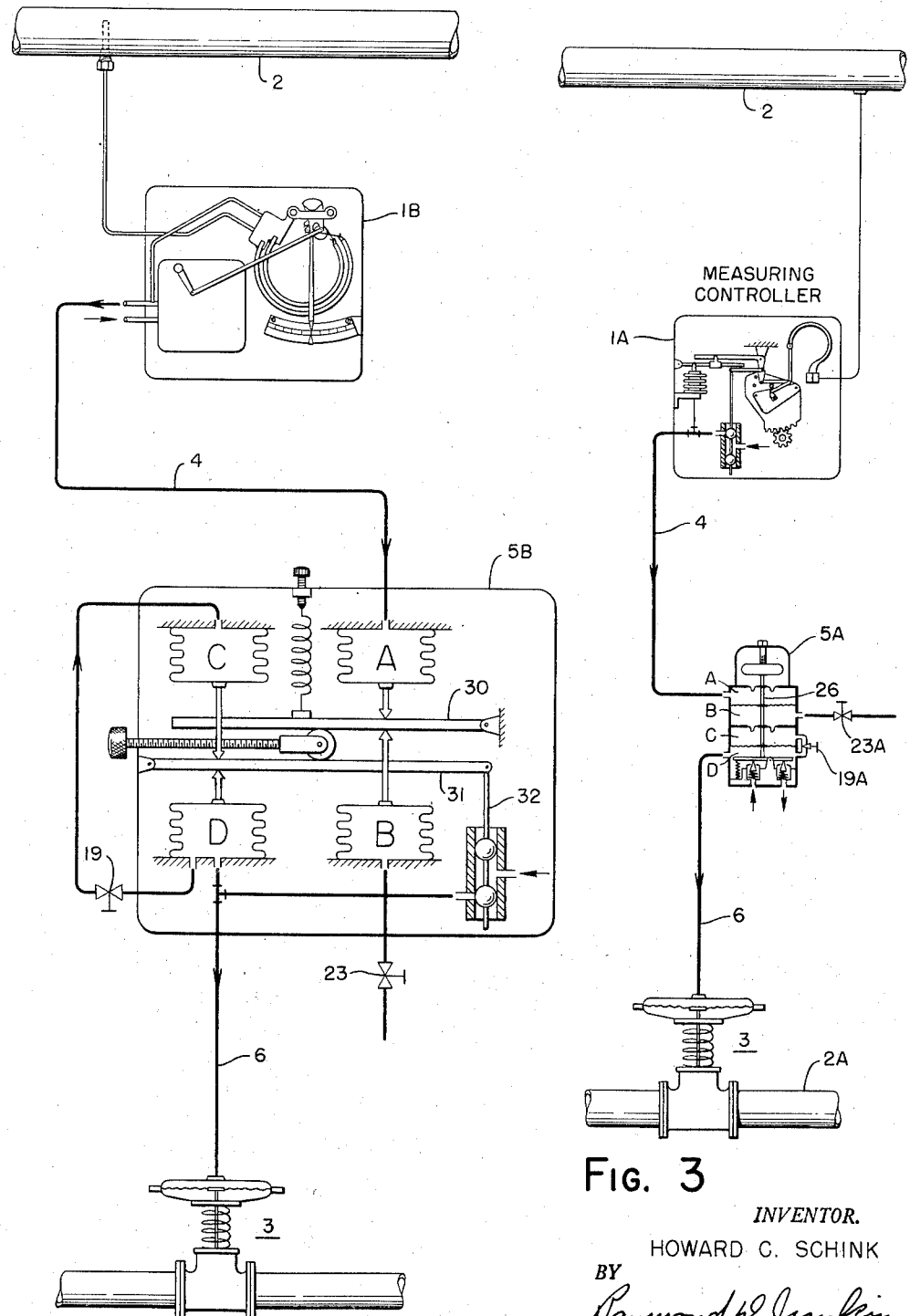
Fig. 3 is similar to Fig. 1 but includes a relay of somewhat different construction.
Fig. 4 is again similar to Fig. 1 but includes a force-balance relay embodying my invention.

In Fig. 3 the trapped chamber C is affected by ambient pressure variations which would introduce an error in the positioning of force beam 26 and in this arrangement the otherwise idle chamber B is provided with a restrictive bleed 23A to the atmosphere and the compensating operation is the same as was described in connection with Fig. 1.

Fig. 4 illustrates a further form of force-balance relay 5B which may be of the general form disclosed and claimed in the co-pending application of Paul S. Dickey S. N. 287,074, now Patent 2,747,595, wherein the A and B chambers act upon a force-balance beam 30 while the C and D chambers act upon a force-balance beam 31. The beam system is arranged to position a pilot valve 32, another form of supply and waste valve or fluid pressure couple, establishing in the D chamber and in the output pipe 6 the outgoing control pressure for the valve 3. This being a force-balance system, similar in that respect to the relay 5A of Fig. 3, the otherwise idle B chamber may be utilized for the compensating action and is connected to atmosphere through a restrictive bleed 23. The measuring controller 1B may be of the type disclosed in the co-pending Dickey application S. N. 219,924, now abandoned, establishing in the pipe 4 a fluid loading pressure continuously representative of the value of temperature within the conduit 2.

Fig. 5 illustrates the application of my invention to a differential standardizing relay 35 receiving in its A chamber a fluid loading pressure from the pipe 4 representative of temperature within the conduit 2, through the agency of a measuring controller 36 which may be of the type disclosed and claimed in the co-pending Gorrie application S. N. 289,402, now Patent 2,737,963. Two variable conditions are to be algebraically compared so that I connect to the B chamber of the relay 35 a fluid a loading pressure existing in pipe 37 established by the measuring controller 38 continuously representative of the second variable. Ordinarily the differential standardizing relay 35 would produce in its D chamber and output pipe 6A a fluid control pressure of a standardizing nature initiated by the algebraic comparison of the loading pressures in the A and B chamber. However, the C chamber of the relay 35 is affected by variations in ambient pressure as previously mentioned and so, in the present figure, I lead the pipe 6A to the A chamber of a force-balance relay 39 whose B chamber is used as a compensating chamber having an adjustable restriction 23 bleeding to the atmosphere.

Another way of accomplishing the desired compensation is shown in Fig. 6 which depicts a flow ratio control between the two fluid rates of flow in conduits 2 and 40 for regulating the control valve 3 in accordance with a comparison of the flow rates. A fluid loading pressure is established in pipe 4 representative of the fluid rate of flow in the conduit 2 while a similar fluid loading pressure is established in the pipe 41 representative of the fluid rate of flow in the conduit 40. These are led to the A and B chambers respectively of relay 42 whose output available in the pipe 43, is lead to the A chamber of a standardizing relay 44 having adjustable bleed restriction 23 from the B chamber to the atmosphere.

To show still another form of trapped chamber relay to which the compensation of the present invention may be applied I illustrate in Fig. 7 a form of accelerating relay having an input loading pressure in pipe 4 and an outgoing developed control pressure in pipe 6. The system of Fig. 7 is of the accelerating relay type generally disclosed and claimed in the Fitch Patents 2,441,405 and 2,586,637 although equally adaptable to other types. Herein the accelerating relay 45 receives the pipe 4 loading pressure in its A and C chamber and has a compensating chamber B receptive of the output of a secondary relay 46 which receives the pipe 4 loading pressure in its A chamber by way of restrictive valve 47. The B chamber of relay 46 is open to the atmosphere through the restrictive valve 48.

It will be appreciated that I have shown in the several figures of the drawing different types and arrangements of relays, each having a trapped chamber requiring compensation for variations in ambient pressure values. There are undoubtedly other types of relay and arrangements of same which may equally as well be adapted to use of the present invention which is primarily directed to those trapped chambers receiving restrictive bleed pressures from active chambers and which are affected by variations in barometric or ambient pressure values otherwise adversely affecting the pressure imposed by the relay chambers upon the force or position balance systems.

While I have chosen to illustrate and describe certain preferred embodiments of my invention, particularly in connection with pneumatic pressure systems, it will be appreciated that the invention is equally applicable to other fluid pressure systems or to mixed systems. For example, regardless of what fluid is used for the loading pressures and/or the control pressures (for example oil or water), it is still feasible to have the compensating chamber and its restrictive bleed valve acting on atmospheric air because the action of the relays and the compensating action of my invention are strictly on relation in pressures between absolute and gage pressures and irrespective of the transmitting fluid.

What I claim as new and desire to secure by Letters Patent of the United States, is:

1. In a fluid pressure relay having, a system of beam members, means applying a predetermined force to pivot each beam of the system, fluid pressure supply and waste valve positioned by a beam of the system, a first chamber acting on the beam system in response to a variable fluid loading pressure received, a second chamber acting on the system in response to the output of the supply and waste valve, a third chamber acting on the system in response to the output of the supply and waste valve, and a restriction in the connection between the third chamber and the supply and waste valve; the improvement including, a fourth chamber acting on the beam system in opposition to the force exerted by the third chamber, and an adjustable bleed restriction in the connection between the fourth chamber and the atmosphere.

2. The combination of claim 1 in which the beam system of the relay includes a pair of beams, the supply and waste valve is a nozzle-baffle combination, and wherein one of the elements of the valve is positioned by one beam and the other of the elements is positioned by the other beam.

3. The combination of claim 1, in which a fifth chamber is positioned to vary the volume of the fourth chamber, and a connection is located between the fifth chamber and the third chamber.

4. A force-position-force-balance fluid pressure relay including, a first force-balance beam, a first spring acting to pivot the first beam about a fulcrum, a first pair of expansible-contractible fluid pressure receiving chambers opposing each other in pivoting the first beam about its fulcrum, a second force-balance beam, a second spring acting to pivot the second beam about a fulcrum, a second pair of expansible-contractible fluid pressure receiving chambers opposing each other in pivoting the second beam about its fulcrum, means for applying a variable fluid loading pressure to one of the first pair of chambers, a fluid pressure couple controlled by the relative position of the two beams about their fulcrums, connections for applying the output of the couple to the second pair of chambers, a first restriction in the connection between the couple and one of the second pair of chambers, a fifth expansible-contractible chamber acting on the second beam in opposition to the chamber of the second pair of chambers which is restricted to the couple, and a second restriction between the atmosphere and the fifth chamber.

5. The relay of claim 4 including a sixth expansible-contractible member mounted within the fifth chamber, and a connection between the sixth chamber and the chamber of the second pair of chambers which is restricted to the couple.

References Cited in the file of this patent

UNITED STATES PATENTS

| | | |
|---|---|---|
| 2,061,118 | Vogt | Nov. 17, 1936 |
| 2,297,361 | Mallory | Sept. 29, 1942 |
| 2,431,297 | Moore | Nov. 18, 1947 |
| 2,475,630 | Melas et al. | July 12, 1949 |
| 2,536,184 | Johnson | Jan. 2, 1951 |
| 2,626,626 | Rosenberger et al. | Jan. 27, 1953 |
| 2,637,334 | Starkey | May 5, 1953 |
| 2,658,392 | Vannah | Nov. 10, 1953 |
| 2,684,078 | Paulison et al. | July 20, 1954 |
| 2,705,018 | Gray | Mar. 29, 1955 |
| 2,747,595 | Dickey | May 29, 1956 |

FOREIGN PATENTS

| | | |
|---|---|---|
| 536,537 | Great Britain | May 19, 1941 |